United States Patent
Latten et al.

(10) Patent No.: US 7,886,277 B2
(45) Date of Patent: *Feb. 8, 2011

(54) SYSTEM AND METHOD FOR ERROR CHECKING OF FAILED I/O OPEN CALLS

(75) Inventors: Joy Marie Latten, Austin, TX (US); Kimberly DaShawn Simon, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 270 days.

This patent is subject to a terminal disclaimer.

(21) Appl. No.: 12/264,843

(22) Filed: Nov. 4, 2008

(65) Prior Publication Data

US 2009/0063905 A1    Mar. 5, 2009

Related U.S. Application Data

(63) Continuation of application No. 11/138,829, filed on May 26, 2005, now Pat. No. 7,464,374.

(51) Int. Cl.
 *G06F 9/44*    (2006.01)
 *G06F 11/00*    (2006.01)

(52) U.S. Cl. .................. 717/125; 714/25; 714/38; 717/101; 717/113

(58) Field of Classification Search ......... 717/100–101, 717/113, 124–135; 714/25, 37–57
 See application file for complete search history.

(56) References Cited

U.S. PATENT DOCUMENTS 5,628,016 A * 5/1997 Kukol .................. 717/140
5,862,382 A * 1/1999 Kataoka ................ 717/131
5,911,075 A    6/1999 Glaser et al.

(Continued)

FOREIGN PATENT DOCUMENTS

EP          463732 A2 *    1/1992

OTHER PUBLICATIONS

Fu et al., "Navigating Error Recovery Code in Java Applications"; ACM, 2005; 5pg.*

(Continued)

*Primary Examiner*—Wei Y Zhen
*Assistant Examiner*—Ryan D Coyer
(74) *Attorney, Agent, or Firm*—Yee & Associates, P.C.; Matthew W. Baca

(57) ABSTRACT

A system and method in a data processing system for error checking and resolving failed input/output open calls. A configuration mechanism configures the options, such as the information stored in databases, details of how each error check is performed, and what actions should be taken when improper error checking occurs. Based on data stored in databases, such as an I/O calls database, a rules with syntax database, and an usage calls database, a code analyzer analyzes code in software programs for an error check of a failed input/output open call. A reporting mechanism reports data from the analyzed code to a report file, such as why software programs have proper and improper error-checking instances, sends errors from the analyzed code to an error file, and enables these files to be displayed on a display. Finally, the code analyzer enables resolving an improper error check for the failed input/output open call.

16 Claims, 3 Drawing Sheets

U.S. PATENT DOCUMENTS

| | | |
|---|---|---|
| 5,953,731 A | 9/1999 | Glaser |
| 6,446,097 B1 | 9/2002 | Glaser |
| 7,028,222 B2 * | 4/2006 | Peterson et al. ............... 714/38 |
| 7,194,732 B2 * | 3/2007 | Fisher et al. ................ 717/131 |
| 7,203,926 B2 * | 4/2007 | Bogle et al. ................. 717/124 |
| 2006/0005078 A1 * | 1/2006 | Guo et al. .................... 714/38 |
| 2006/0156286 A1 | 7/2006 | Morgan et al. |

OTHER PUBLICATIONS

Holmes et al., "Using Structural Context to Recommend Source Code Examples"; ACM, 2005; 9pg.*

"Software Compiler for Analyzing and Measuring Programs", IBM Technical Disclosure Bulletin, v36, n9A, 09-93, 5 pages.

"Code Analyzer Tool", pp. 1-2 http://www.sweb.cz/ivan.zderadicka/codeanalyzer.html.

* cited by examiner

FIG. 5 open(), fopen(), fdopen(), freopen(), creat(), fcntl(), socket()

FIG. 6

```
while (fd != -1)
while (fd > 0)
if (fd != -1)
if (fd > 0)
if (fd == -1)
fd != 0 ? ...:...
fd > 0 ...:...
fd == -1 ? ...:...
switch (fd)
while (fd != NULL)
while (fd)
if (fd != NULL)
if (fd == NULL)
fd ? ...:...
fd == NULL? ...:...
```

FIG. 7 read(), write(), fread(), fwrite(), fgetc(), fgets(), getc(), ungetc(), fputc(), fputs(), putc(), ferror(), fileno(), feof(), fseek(), clearer(), accept(), connect(), bind(), getsockname(), getsockopt(), listen(), select(), ioctl(), recv(), recvfrom(), recvmsg(), sendmsg(), sendto(), send()

US 7,886,277 B2

SYSTEM AND METHOD FOR ERROR CHECKING OF FAILED I/O OPEN CALLS

This application is a continuation of application Ser. No. 11/138,829, filed May 26, 2005, status pending.

BACKGROUND OF THE INVENTION

1. Technical Field

The present invention relates generally to an improved data processing system and, in particular, to a method, system and computer program product for optimizing performance in a data processing system. Still more particularly, the present invention provides a method, system, and computer program product to ensure software quality through error checking and resolving failed input/output open calls.

2. Description of Related Art

Failure to ensure software quality can jeopardize a company's reputation, as well as cause significant profit loss. Poor software quality can be a result of poor error checking. For example, a software program accesses an external device, such as reading a hard disk, but fails to check the access request for errors. Since software today completes ample Input and Output (I/O) manipulations, an area of error checking that can increase software quality is failed I/O open calls. An example of an I/O open call is "open(x)," where "x" is a hardware device that the software code is accessing, or opening, so that subsequent software code can read data from the hardware device. If an I/O open call fails and subsequent software code uses the return value, or data, without properly handling error cases, the software code could have erratic or unintended behavior. Tools exist today that check for ignored return values. However, these tools only provide reporting mechanisms, but no resolutions.

Therefore, it would be advantageous to have a method, system, and computer program product to ensure software quality through error checking and resolving failed Input/Output open calls.

SUMMARY OF THE INVENTION

The present invention provides a method, system, and computer program product for ensuring software quality through error checking and resolving of failed input/output open calls. A configuration mechanism configures the options, such as the information stored in databases, details of how each error check is performed, and what actions should be taken when improper error checking occurs. Based on data stored in databases, such as an I/O calls database, a rules with syntax database, and an usage calls database, a code analyzer analyzes code in software programs for an error check of a failed input/output open call. A reporting mechanism reports data from the analyzed code to a report file, such as why software programs have proper and improper error-checking instances, sends errors from the analyzed code to an error file, and enables these files to be displayed on a display. Finally, the code analyzer enables resolving an improper error check for the failed input/output open call.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an example of the I/O open calls found in the I/O open calls database for error checking and resolving failed input/output open calls, according to a preferred embodiment of the present invention;

FIG. 6 is an example of the rules with syntax found in the rules with syntax database for error checking and resolving failed input/output open calls, according to a preferred embodiment of the present invention; and FIG. 7 is an example of the usage calls in the usage calls database for error checking and resolving failed input/output open calls, according to a preferred embodiment of the present invention.

DETAILED DESCRIPTION OF THE PREFERRED EMBODIMENT

Figure 1:
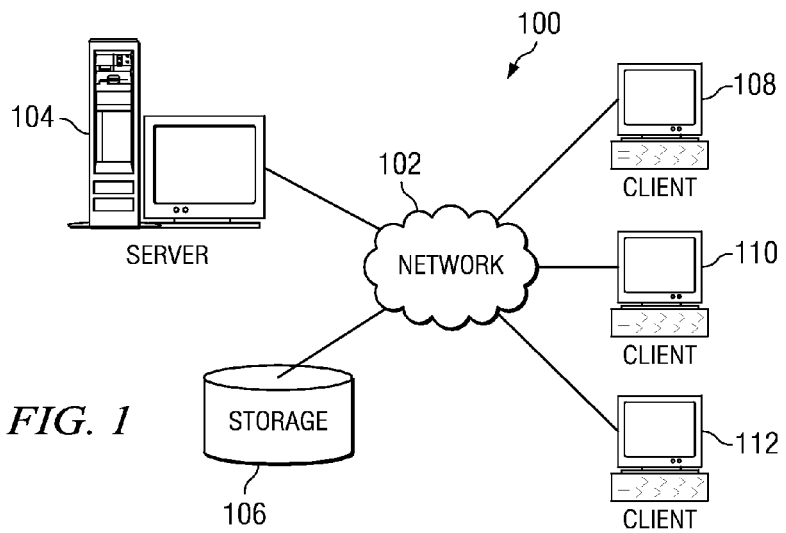
FIG. 1 is a pictorial representation of a data processing system in which the present invention may be implemented in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
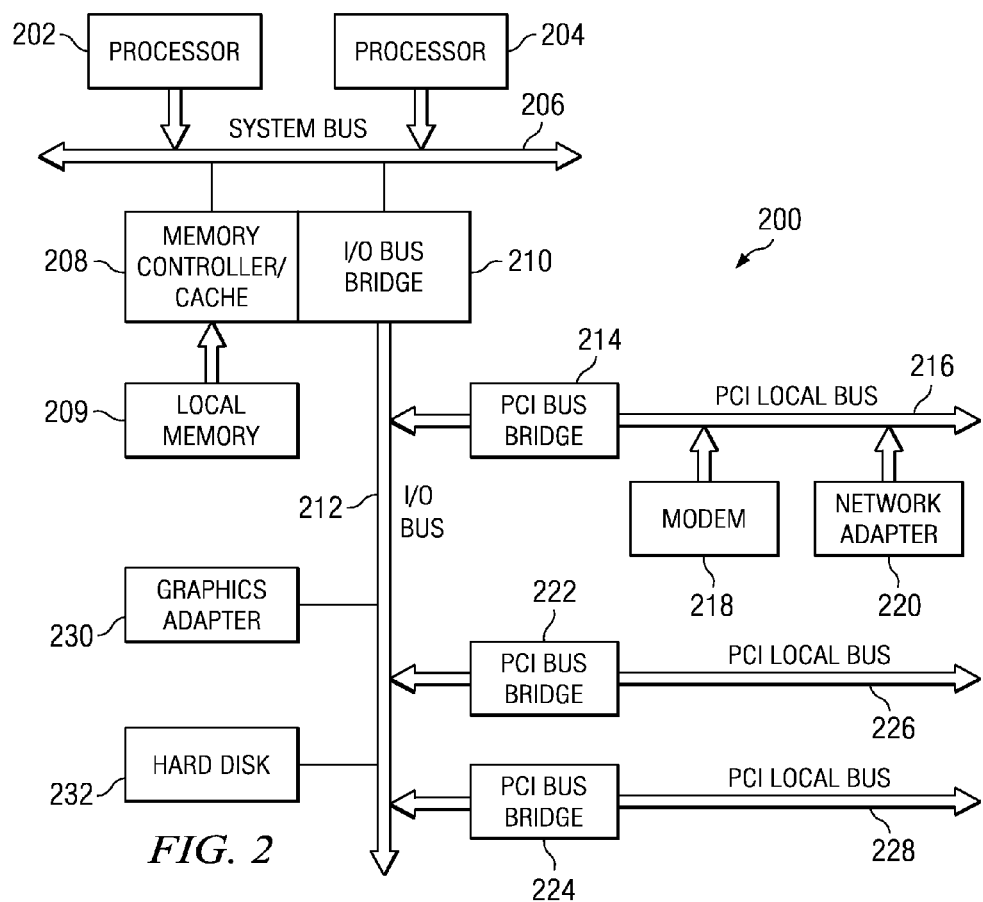
FIG. 2 is a block diagram of a data processing system that may be implemented as a server, is depicted in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
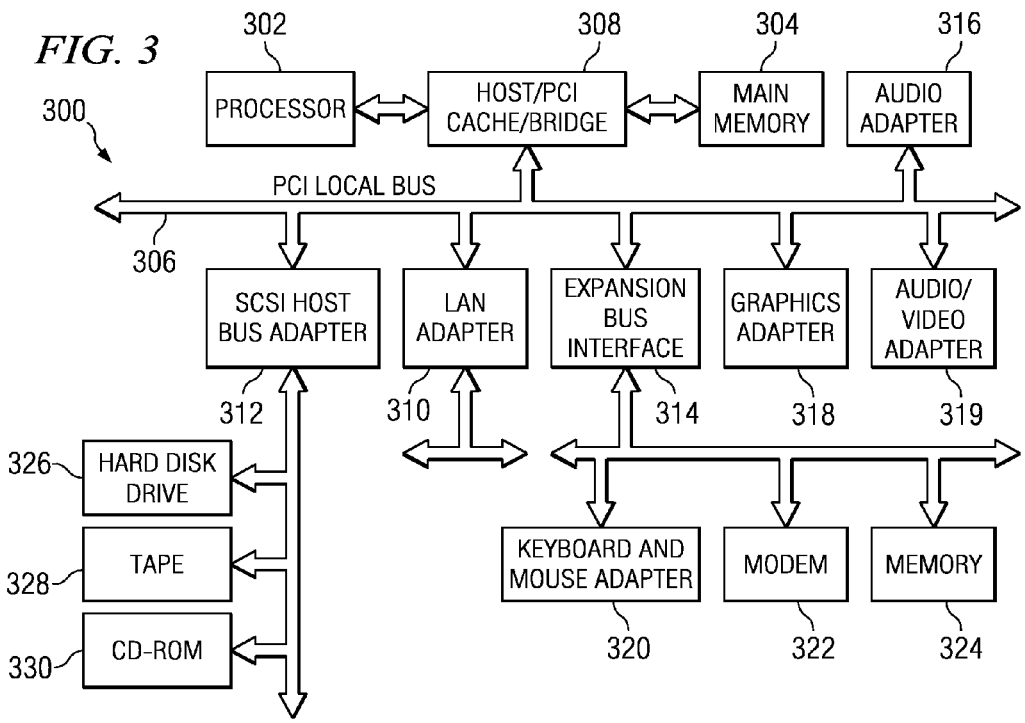
FIG. 3 is a block diagram illustrating a data processing system is depicted in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a system and method for error checking and resolving failed input/output (I/O) open calls. The invention involves examining software programs (in C, C++, Java, etc.) stored on a server for specific I/O open calls, checking that the software code properly handles error cases of the return values for the I/O open calls before proceeding to use those return values, and providing resolutions for failed I/O open calls. Typically current solutions only check to see if return values from I/O open calls have been used, but do not ensure that software developers have properly checked and resolved error cases prior to using the return values. This invention takes further measures to ensure that the proper error checking is in place, and provides resolution for improper checking, which prevents erratic and unintentional code behavior, thereby increasing software quality.

Figure 4:
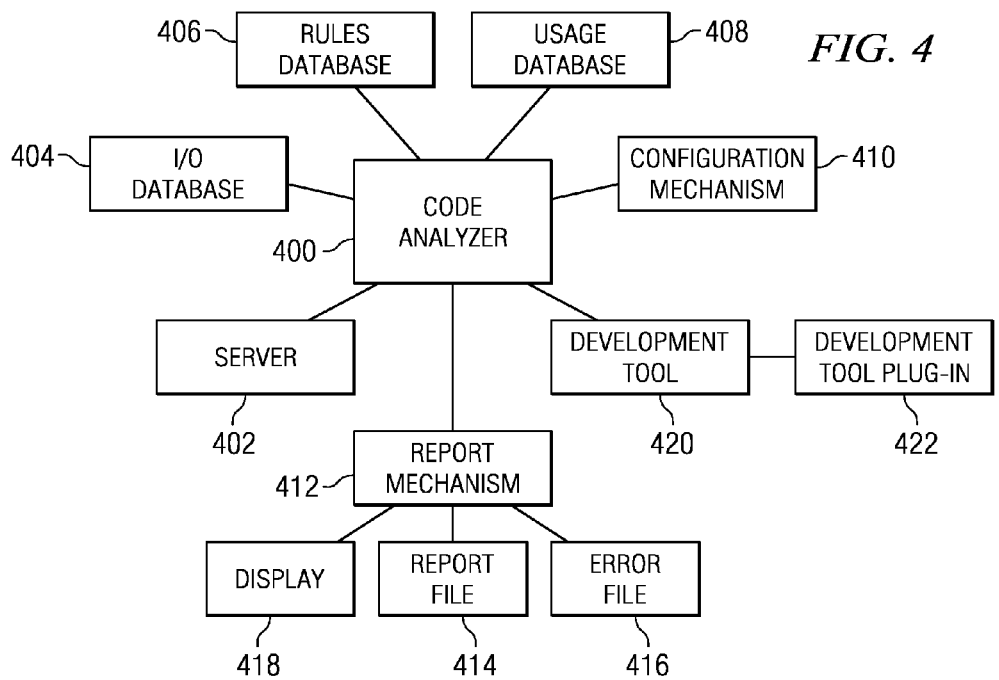
FIG. 4 is a block diagram of the components for error checking and resolving failed input/output open calls, according to a preferred embodiment of the present invention.

FIG. 4 is a block diagram of the components for error checking and resolving failed input/output open calls, according to a preferred embodiment of the present invention, which may be implemented using components of a data processing system, such as data processing system 300 in FIG. 3. Code analyzer 400 examines a set of software programs on server 402 for proper error checking of failed I/O open calls, where the set of software programs is comprised of one or more software programs. Code analyzer 400 is able to interpret software programs implemented in any software programming language and able to examine software programs on any type of server. Code analyzer 400 checks software programs based on data stored in set of databases, which includes one or more database. Examples of databases include I/O calls database 404, rules with syntax database 406, and usage calls database 408. The options for code analyzer 400 are configured by the user through configuration mechanism 410, such as details of how each error check is performed and what actions should be taken when improper error checking occurs. Code analyzer 400 sends data about what to report to report mechanism 412, such that report mechanism 412 reports any data to report file 414 and reports any errors that occur during execution to error file 416. Then the user can access report file 414 and error file 416 directly through display 418, which can be a terminal screen, PDA, etc., or through e-mail.

Code analyzer 400 has a resolution feature that allows users to specify via configuration mechanism 410 what actions should be taken when improper error checking occurs. This feature enables code analyzer 400 to automatically resolve improper error checking. For example, the I/O open call, such as open from I/O database 404, has a number of documented error conditions. Code analyzer 400 checks that each error condition of the I/O call has been properly checked prior to further usage (such as "fread" from usage calls database 408). The feature provides resolutions such as flagging or highlighting the improper error checking code, displaying the correct error checking code, etc., as specified by the user through configuration mechanism 410.

Code analyzer 400 can also enable error checking and resolving failed I/O open calls on development tool 420, a software tool that is used to help user's development code, such as Eclipse, VisualAge, WebSphere, etc. Development tool 420 is used with development tool plug-in 422, to enable the various features of this invention. Development plug-in 422 can be used to examine software programs developed using development tool 420. Development tool plug-in 422 automatically resolves improper error checking in real-time. Real-time means that as a user codes a software program, development tool 420 is able to flag or highlight improper handling or error cases, development tool 420 reports these results as configured, and the development tool plug-in's configurable resolutions take place as improper error checking occurs.

For example, a particular open call has five error cases. As soon as the user types " . . . open . . . " (for example, "fd=open( )"), the I/O open call may be flagged or highlighted in a distinct color, where the user specifies the color as a configurable feature. This color signifies that a match has been found in I/O open calls database 404. If the user types " . . . fread . . . ", which has a match in usage calls database 408, before doing proper error-checking as specified in rules sets database 406, the resolution feature automatically displays a switch statement covering each error case that was either not checked or improperly checked. The user cannot continue coding until after selecting the options displayed by development tool 420 through display 418, in order to handle each error case that was either not checked or improperly checked.

Configuration mechanism 410 allows the user to configure a set of types of the set of software programs in server 402 or development tool 420 that the user would like to check, such as C and C++ programs only, etc., whereby the set of types includes one or more types. The user uses configuration mechanism 410 to specify the interval or frequency in which he would like the software programs in server 402 to be examined or checked. Additionally, the user uses configuration mechanism 410 to specify the information stored in databases, such as I/O open calls database 404, rules sets database 406, and usage calls database 408. Furthermore, configuration mechanism 410 specifies the format of output to display 418. Other specifications selected by configuration mechanism 410 include where report mechanism 412 sends reports and errors, such as to e-mail or display 418, what errors report mechanism 412 sends to error file 416, and what reports report mechanism 412 sends to report file 414. Furthermore, configuration mechanism 410 allows the user to specify to code analyzer 400 what to do when a software program has improper error checking, details of how each error check is performed (such as when it is executed), the collection of a set of operational statistics for the set of software programs (such as the number and causes of improper error checking, an estimation of the percentage of software quality, and so on), etc., whereby the set of operational statistics contains one or more statistics. These specifications allow the user to completely tailor the entire process of how software programs are checked. The set of the options selected by the user in configuration mechanism 410 includes one or more options, and are sent to code analyzer 400.

I/O open calls database 404 stores a set of I/O open calls (such as open, fopen, etc.) that should be searched for in software programs in server 402 or development tool 420, whereby the set of I/O open calls includes one or more I/O open calls. Typically, these I/O calls will return a non-zero integer upon success and a negative one (−1) on failure, or a FILE* upon success and a NULL upon failure. The user can update I/O open calls database 404 as needed through configuration mechanism 410 via code analyzer 400. The user can opt to have I/O open calls database 404 pre-loaded with a pre-determined set of I/O open calls. FIG. 5 is an example of the I/O open calls found in I/O open calls database 404 for error checking and resolving failed input/output open calls, according to a preferred embodiment of the present invention.

Rules with syntax database 406 stores a set of rules with syntax (such as while (fd!=−1), etc.) that should be searched for in software programs in server 402 or development tool 420, whereby the set of rules with syntax includes one or more rules with syntax. The user can update rules with syntax database 406 as needed through configuration mechanism 410 via code analyzer 400. The user can opt to have rules with syntax database 406 pre-loaded with a pre-determined set of syntax-matching rules. FIG. 6 is an example of the rules with syntax found in rules with syntax database 406 for error checking and resolving failed input/output open calls, according to a preferred embodiment of the present invention.

Usage calls database 408 stores a set of usage calls (such as read, write, etc.) that should be searched for in software programs in server 402 or development tool 420 in which the return values from the I/O open calls stored in I/O open calls database 404 are used, whereby the set of usage calls includes one or more usage calls. The user can update usage calls database 408 as needed through configuration mechanism 410 via code analyzer 400. The user can opt to have usage calls database 408 pre-loaded with a pre-determined set of usage calls. FIG. 7 is an example of the usage calls in usage calls database 408 for error checking and resolving failed input/output open calls, according to a preferred embodiment of the present invention.

Report mechanism 412 reports proper and improper error checking. These results are sent to report file 414 and error file 416. The user can configure report mechanism 412 through configuration mechanism 410 to report additional information such as why software programs have proper and improper error-checking instances, as well as where to correct or add error-checking and resolutions, etc. This provides evidence on how properly software programs handle error checking or ensure software quality.

Server 402 is where the software programs reside to be checked by code analyzer 400. Server 402 can be of any type (i.e., Linux, Windows, AIX, etc.) or any configuration. The software programs that reside on server 402 can be in any software programming language (i.e. C, C++, Java, etc.). Server 402 returns requested data to code analyzer 400 in order to determine whether the error-checking for failed I/O open calls is proper.

Altogether, the method and system of the present invention described above provides error-checking and resolutions for failed input/output open calls.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method system for error checking and resolving failed input/output open calls, the method comprising:
    examining source code of a software program being developed using a software development tool;
    configuring a set of method options that control analysis, by the software development tool, of error checking of failed input/output (I/O) open calls within the source code;
    analyzing data from the analysis of the error checking of the failed I/O open calls, based on the configured set of method options;
    determining, from the analyzed data, whether the error checking is improper, wherein the determining comprises identifying at least one I/O open call for which corresponding error checking code is absent or incomplete; and
    responsive to an error check being determined improper, automatically resolving the improper error checking for the failed I/O open calls, wherein the resolving comprises, for each I/O open call for which corresponding error checking code is absent or incomplete, generating and displaying a correct error checking code to a user of the software development tool.

2. The method of claim 1, wherein the configuring comprises specifying a set of types of the set of programs to error check, how each error check is performed, a frequency for the set of programs to be error checked, a set of operational statistics for the set of programs, data stored in the set of databases, where the data is reported and the errors are sent, the errors sent to the error file, the data reported to the report file, an output format for the display, and a resolution for the improper error check for the failed input/output open call.

3. The method of claim 1, wherein the analyzing comprises documenting a number of error conditions.

4. The method of claim 1, wherein resolving the improper error checking comprises highlighting improper error checking code.

5. The method of claim 1, further comprising, responsive to the determining, reporting a result of proper and improper checking to a file.

6. The method of claim 3, wherein the analyzing further comprises examining data based on a predetermined set of information in a database.

7. A data processing system for error checking and resolving failed input/output open calls, the data processing system comprising a processor and a memory communicatively coupled to the processor, the memory storing instructions, the instructions comprising:
    an examination mechanism for examining source code of a software program being developed using a software development tool;
    a configuring mechanism for configuring a set of method options that control error checking, by the software development tool, of failed input/output (I/O) open calls within the source code; and
    a code analyzing mechanism that analyzes data from the error checking of the failed input/output I/O open call, based on a set of method options configured by the configuring mechanism;
    a determination mechanism for determining, from the analyzed data, whether the error checking is improper, wherein the determining comprises identifying at least one I/O open call for which corresponding error checking code is absent or incomplete; and
    a resolution mechanism for, responsive to an error check being determined improper, automatically resolving the improper error checking for the failed I/O open calls, wherein the resolving comprises, for each I/O open call for which corresponding error checking code is absent or incomplete, generating and displaying a correct error checking code to a user of the software development tool.

8. The data processing system of claim 7, further comprising a server in communication with the code analyzing mechanism, wherein the code analyzing mechanism examines a set of programs stored on the server to determine proper error checking of the failed I/O open call, based on data stored in a set of databases.

9. The data processing system of claim 8, wherein the set of databases includes an I/O open calls database that stores a set of I/O open calls that is searched for in the set of programs, the set of I/O open calls being pre-loaded with a pre-determined set of I/O open calls.

10. The data processing system of claim 8, wherein the set of databases includes a rules with syntax database that stores a set of rules with syntax that is searched for in the set of programs, the set of rules with syntax being pre-loaded with a pre-determined set of rules.

11. The data processing system of claim 7, further comprising:
    for reporting mechanism that reports a result of a proper error checking and an improper error checking to an error file in a format specified by the configuring mechanism.

12. A computer program product comprising a computer-recordable medium including instructions embodied thereon, which when executed, perform actions of error checking and resolving of failed input/output open calls, the actions comprising:
    examining source code of a software program being developed using a software development tool;

configuring a set of method options that control analysis, by the software development tool, of error checking of failed input/output (I/O) open calls within the source code;

analyzing data from the analysis of the error checking of the failed I/O open calls, based on the configured set of method options;

determining, from the analyzed data, whether the error checking is improper, wherein the determining comprises identifying at least one I/O open call for which corresponding error checking code is absent or incomplete; and responsive to an error check being determined improper, automatically resolving the improper error checking for the failed I/O open calls, wherein the resolving comprises, for each I/O open call for which corresponding error checking code is absent or incomplete, generating and displaying a correct error checking code to a user of the software development tool.

13. The computer program product of claim 12, wherein the configuring comprises specifying a set of types of the set of programs to error check, how each error check is performed, a frequency for the set of programs to be error checked, a set of operational statistics for the set of programs, data stored in the set of databases, where the data is reported and the errors are sent, the errors sent to the error file, the data reported to the report file, an output format for the display, and a resolution for the improper error check for the failed input/output open call.

14. The computer program product of claim 12, wherein the analyzing comprises documenting a number of error conditions.

15. The computer program product of claim 12, wherein resolving the improper error checking comprises highlighting improper error checking code.

16. The computer program product of claim 12, further comprising, responsive to the determining, reporting a result of proper and improper checking to a file.

* * * * *